United States Patent [19]

Headley

[11] Patent Number: 5,193,891
[45] Date of Patent: Mar. 16, 1993

[54] CARTRIDGE RETAINING MEANS

[75] Inventor: James E. Headley, Whittier, Calif.

[73] Assignee: J. B. Engineering Co., Inc., Monrovia, Calif.

[21] Appl. No.: 662,211

[22] Filed: Feb. 28, 1991

[51] Int. Cl.⁵ .............................................. A47B 81/06
[52] U.S. Cl. ................................. 312/348.3; 312/319.1
[58] Field of Search .................. 211/55, 184; 206/560, 206/564, 387; 312/9, 12, 319, 183, 333, 348.3; 40/618, 124

[56] References Cited

U.S. PATENT DOCUMENTS

| | | | |
|---|---|---|---|
| 2,170,586 | 8/1939 | Canfield | 211/184 X |
| 2,288,637 | 7/1942 | Mauro | 312/333 X |
| 3,298,538 | 1/1967 | Ganz et al. | 211/55 X |
| 3,612,292 | 10/1971 | Nervig | 211/184 |
| 3,811,745 | 5/1974 | Cylke | 312/13 |
| 3,868,018 | 2/1975 | Thies | 211/40 |
| 3,909,088 | 9/1975 | Dennehey et al. | 312/12 |
| 4,051,549 | 9/1977 | Fiege | 361/399 |
| 4,203,519 | 5/1980 | Fujitaki | 206/387 |
| 4,715,669 | 12/1987 | Baillie et al. | 312/12 |
| 4,815,598 | 3/1989 | Richter | 312/15 X |
| 4,815,795 | 3/1989 | Accumanno et al. | 312/12 |
| 4,844,564 | 7/1989 | Price, Sr. et al. | 312/12 |

Primary Examiner—Peter R. Brown
Attorney, Agent, or Firm—Christie, Parker & Hale

[57] ABSTRACT

A retaining bar is disclosed for retaining plural removable storage media cartridges in a spaced-apart relationship in a horizontal or vertical storage cabinet drawer. The retaining bar preferably comprises a molded rubber elongated strip which is press-fit onto an internal divider wall or an upper rail of a cartridge storage drawer or shelf. The strip has a generally inverted "U-shaped" cross-section defined by two spaced-apart horizontally elongated vertical walls each having top edges joined by a convex arcuate upper wall, and having bottom edges angled to receive the internal divider wall of the drawer. An inwardly-protruding shoulder is provided in the space between the strip walls, which shoulder prevents the strip from riding upward off the drawer divider or rail when the device is in use. One or more laterally outwardly-protruding retaining ribs are provided, each having plural compression notches thereon to enable the ribs to compress inwardly when contacted by cartridges in the drawer.

14 Claims, 3 Drawing Sheets

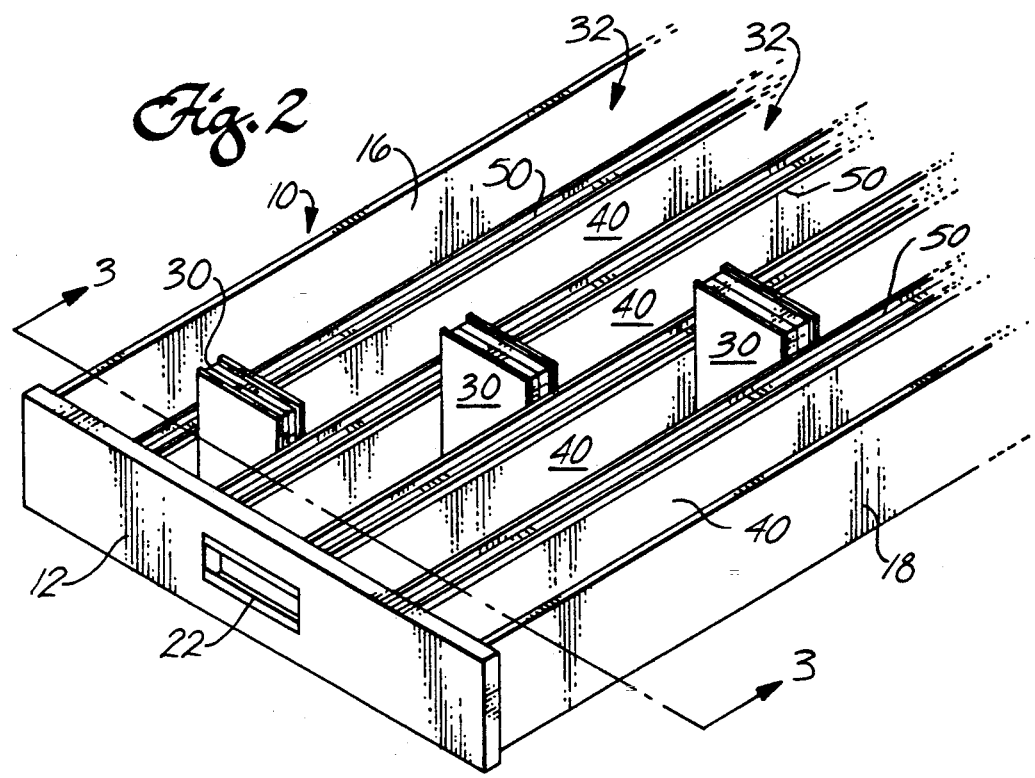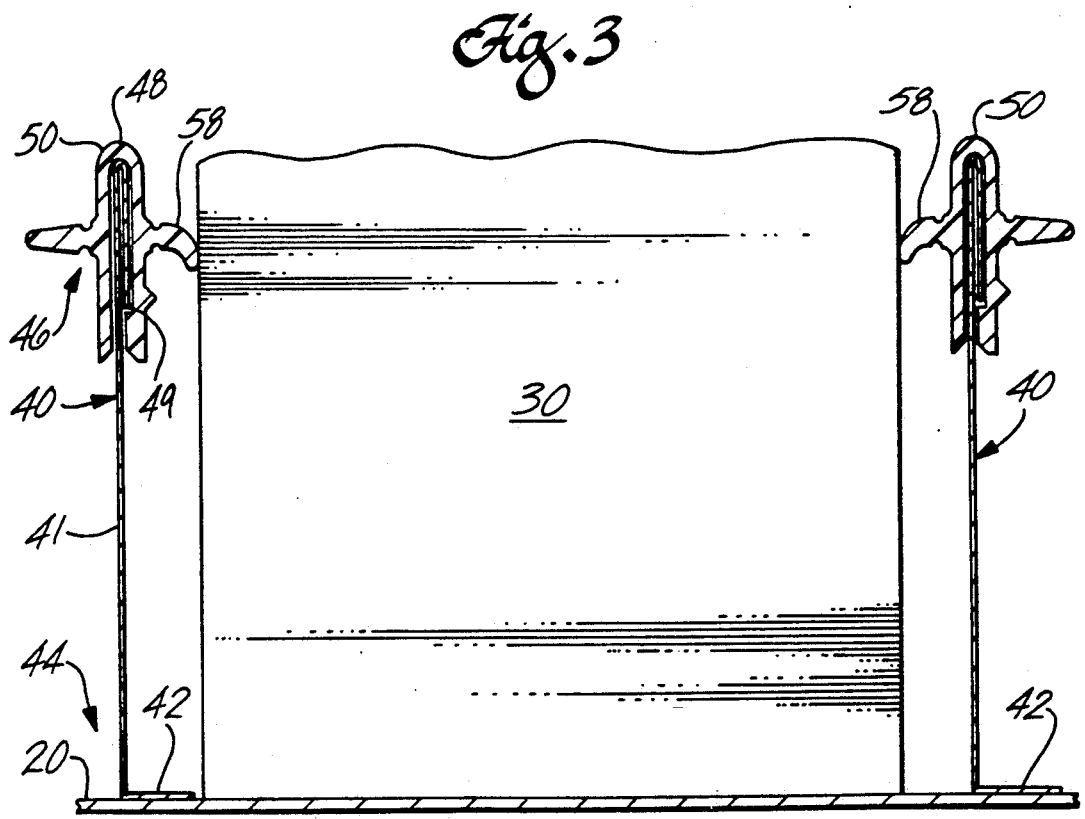

CARTRIDGE RETAINING MEANS

FIELD OF INVENTION

The present invention generally relates to means for retaining plural storage media cartridges in an upright orientation in a storage cabinet or drawer. The invention specifically relates to retaining bar means for retaining plural removable storage media cartridges in a spaced-apart relationship in a storage cabinet or drawer.

BACKGROUND OF INVENTION

Libraries, archives, Government offices, and other information-dependent institutions require large amounts of compact, organized storage facilities for media such as microfilm cartridges, tape cassettes, magnetic media or data cartridges. In the prior art such data storage media are often stored in horizontal or vertical stacks or rows arranged in large drawers or shelves. Often the stacks or rows are organized in chronological or numerical order for ease of filing and retrieval and to prevent loss or misfiling of individual cartridges. Other containers and holders including rigid and semi-rigid sleeves and envelopes are also stored in such facilities.

Unfortunately, this type of storage incorporates a serious disadvantage. Unless retention means are provided, when a single cartridge is removed from a row, the remaining cartridges will tend to slide and move together into the drawer, eliminating the space from which the cartridge was removed. As a result, returning the cartridge to its proper location in the drawer is difficult and time-consuming. First, the correct place for the cartridge must be located, and a space must be created by manually sliding the other cartridges apart.

Thus, a need exists for means to retain plural storage media cartridges or other storage containers in spaced-apart relationship so that when one cartridge is removed, a space remains between the other cartridges, facilitating return of the removed cartridge.

In the prior art this problem has been addressed in various ways. One way to retain cartridges in a spaced-apart relationship is to use biased or sprung retaining means which retain cartridges in place through spring tension acting on a cartridge. This approach is exemplified by U.S. Pat. Nos. 4,715,669 (Baillie et al.), 4,720,153 (Hatcher), 4,815,795 (Accumanno et al.), and 4,844,564 (Price, Sr. et al.).

However, this method requires relatively complex mechanical elements. Moreover, it is also desirable to provide such elements in a form which are easily retrofit to existing lateral cabinet drawers. One desirable way to provide retaining means which is easily retrofit to an existing drawer is to use an elongated strip, with friction retaining means incorporated therein, which can be secured to existing drawer internal dividers, walls, or rails.

In the context of printed circuit board support structures, a retaining bar is provided in U.S. Pat. No. 4,051,549 (Fiege). The device of Fiege comprises a retaining bar 18 secured to a frame member 15 and having plural notches 22, each notch being filled with a resilient material 21. When the edge of a circuit board 20 is forced against a notch 22, the board compresses material 21, retaining the board in place through the internal tension of material 21. However, the device of Fiege does not accommodate relatively thick data cartridges and is not intended to be retrofit to standard microfilm cartridge drawer structures. Fiege also requires use of a resilient material 21, such as soft neoprene, which raises the material and manufacturing costs of the Fiege device.

Thus, the prior art appears deficient in failing to provide means to retain plural storage media cartridges or storage containers in spaced-apart relationship, so that when one cartridge is removed, a space remains between the other cartridges, facilitating return of the removed cartridge. The prior art is likewise deficient in failing to provide cartridge retaining means which is easily retrofit to an existing lateral cartridge drawer, which is inexpensive to manufacture, and which is mechanically simple in construction and operation.

SUMMARY OF INVENTION

Accordingly, the present invention provides drawer and shelf means and retaining bar means for retaining plural removable storage media cartridges in a spaced-apart relationship in a storage cabinet drawer or shelf. The retaining bar means preferably comprises a molded resilient elongated strip which is press-fit onto an elongated support or rail of a lateral storage drawer. In cross-section, the strip is generally shaped as an inverted "U" defined by two spaced-apart horizontally elongated vertical walls each having top edges joined by an arcuate upper wall, and having bottom edges chamfered or angled to receive the internal divider wall of the drawer. An inwardly-protruding shoulder is provided in the space between the strip walls, which shoulder prevents the strip from riding upward off the drawer divider when the device is in use. Two laterally outwardly-protruding retaining ribs are provided, each having plural compression notches thereon to enable the ribs to compress inwardly when contacted by cartridges in the drawer and thereby hold cartridges in place through tension.

BRIEF DESCRIPTION OF DRAWINGS

FIG. 2 is a perspective view of a lateral storage cabinet drawer having strips of FIG. 1 mounted therein.

FIG. 3 is a partial section elevation of the drawer of FIG. 2.

DETAILED DESCRIPTION

Figure 1A:
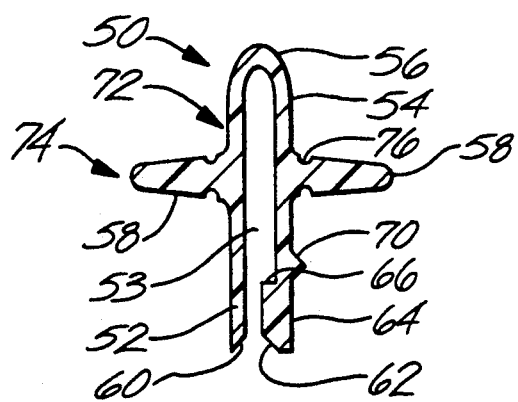
FIG. 1A is a cross-section view of a retaining strip of the present invention.

In the following detailed description of the preferred embodiments, specific terms are used for the sake of clarity. However, the invention is not limited to the specific terms so selected, but rather includes all technical equivalents using substantially similar structures performing the substantially the same functions in substantially the same way.

Referring now to the preferred embodiment of FIGS. 1 to 3, attention is first invited to FIG. 2 which shows a lateral storage cabinet drawer 10 comprising front wall 12, a rear wall (not shown), side walls 16, 18, and floor 20. Each wall 12, 16, 18, and floor 20, is generally rectangular as is known in the art, and is preferably constructed of sheet metal such as sheet steel. The drawer 10 has an open top and plural drawers 10 are usually arranged to slide in a closed cabinet structure (not shown). A handle 22 is provided in or on front wall 12 to enable sliding drawer 10 in and out of the cabinet.

Plural storage media cartridges 30 are placed in drawer 10 and preferably are organized as flat stacks or rows between retaining walls or rails 40. Plural channels 32 are defined by pairs of walls 40, or by one wall 40 spaced apart from side walls 16, 18. Thus the channels 32 prevent side-to-side movement of cartridges 30, although in a conventional drawer the channels 32 do not prevent front-to-rear sliding or movement of cartridges 30. The channels are elongated from front to rear, in what is referred to hereinafter as the longitudinal direction. However, a drawer of the present invention additionally includes plural elongated retaining strips 50 which are fitted on the top edge of walls 40 as shown in FIG. 2. The strips 50 will prevent front-to-rear sliding of cartridges 30 in the manner discussed below.

Strips 50 preferably comprise molded high-impact, resilient rubber or plastic of two different types as discussed below. As seen in FIG. 2, each strip 50 is elongated to run or cover the entire longitudinal length of walls 40.

Structural details of one embodiment of strips 50 are shown in FIG. 1A. Each strip 50 comprises spaced-apart longitudinally elongated vertical left and right walls, designated 52 and 54, joined at their upper ends by a convex arcuate top wall 56. In the preferred embodiment, walls 52, 54, and 56 are integrally molded as a single unit in type RH600 rubber preferably 0.030" thick; separate numeric designations are used herein only for the sake of clarity. The spaced-apart arrangement of walls 52, 54 define a central cavity 53 between walls 52, 54.

The bottom edges of walls 52 and 54 are each chamfered or angled to form angled edges 60, 62. Preferably each angled edge 60, 62 is defined by an angle of 45 degrees, and edges 60, 62 are angled upwardly and inwardly toward cavity 53. The edges 60, 62 provide an open leading edge for strip 50 so that when the strip 50 is placed over a wall 40, the strip 50 can be pressed down quickly without misalignment on wall 40.

Right side wall 54 is additionally provided with a thick lower wall portion 64 having a top edge which defines a inwardly-facing shoulder 66. The shoulder 66 enables the strip 50 to lock on to wall 40, preventing strip 50 from riding upward or from being accidentally pulled upward off wall 40. As shown in FIG. 3, each wall 40 preferably comprises a vertical wall portion 41 joined, at a right angle, to a floor arm 42. The floor arm 42 is preferably welded or otherwise attached to floor 20 of drawer 10. Top end 46 of wall 40 is folded over to form a top strip 48 having a downwardly facing edge 49. When strip 50 is placed on wall 40, shoulder 66 will abut edge 49, preventing strip 50 from being pulled upward.

Right wall 54 additionally includes an outwardly facing angled protrusion or lead 70, which functions to indicate the side of strip 50 in which shoulder 66 is located so as to enable orientation of strip 50 with shoulder 66 on the proper side of wall 40 so as to engage edge 49. In a alternate embodiment (see FIG. 1B) both side walls 52, 54 are provided with thicker lower wall portions such as portion 64 and inwardly facing shoulders such as shoulder 66 so that strip 50 is always properly oriented when placed on wall 40. In this embodiment the need for protrusion 70 is eliminated.

Figure 1B:
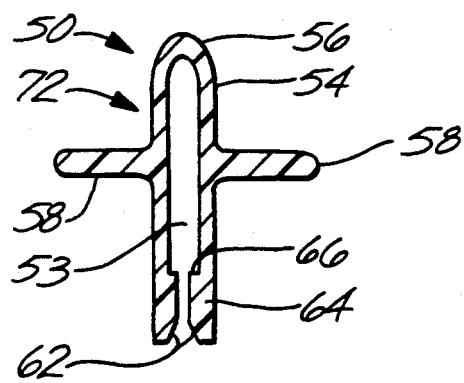
FIG. 1B is a cross-section view of an alternate embodiment of a retaining strip of the present invention.

Attention is again invited to FIG. 1 in which two laterally outwardly protruding retaining ribs 58 are shown secured to either wall 52, 54 of strip 50 at base end 72 of ribs 58. Ribs 58 preferably are constructed of type 62 rubber which is more resilient and compressible than the type RH 600 rubber used for walls 52, 54, and 56, as is known in the art. Each base end 72 has a thickness greater than the terminal end 74 of each rib 58. Plural compression notches 76 are provided in ribs 58. The notches 76 enable ribs 58 to deflect and compress inwardly and downwardly when terminal end 74 is contacted by a cartridge 30 placed in the drawer 10 between strips 50. Notches 76 define the point of deflection of ribs 58 and such notches can be located adjacent to walls 52, 54 or placed at a more remote location along the lateral extent of rib 58. In an alternate embodiment, notches 76 are eliminated and ribs 58 are molded in such a manner that they are thinner than shown in FIG. 1A and more uniform in cross-section as shown in FIG. 1B.

As shown in FIG. 3, ribs 58 protrude laterally into channels 32 of the drawer 10 such that cartridges 30 are snugly press-fit between a pair of ribs 58. This press-fitting action is facilitated by the compression and partial deflection of ribs 58 which occurs when a cartridge 30 is placed between the ribs 58. In the two channels 32 located adjacent the edge of drawer 12, a single strip 50 is sufficient to retain the cartridges stored in those channels.

Thus, ribs 58 of strips 50 enable a drawer 10 to be filled with plural cartridges 30 each retained in place through tension provided by the resilient compression of ribs 58 against the side walls of a cartridge 30. The snug fit of the cartridges 30 holds the cartridges in place and prevents front-to-rear (longitudinal) sliding of cartridges 30. Additionally, when a cartridge 30 is removed from the drawer 10 using strips 50 of the present invention, surrounding cartridges are retained in place and do not slide into the space left by the removed cartridge. Instead, each cartridge is retained in place so that when the drawer is opened later, the space from which a cartridge was removed is immediately apparent.

Figure 4:
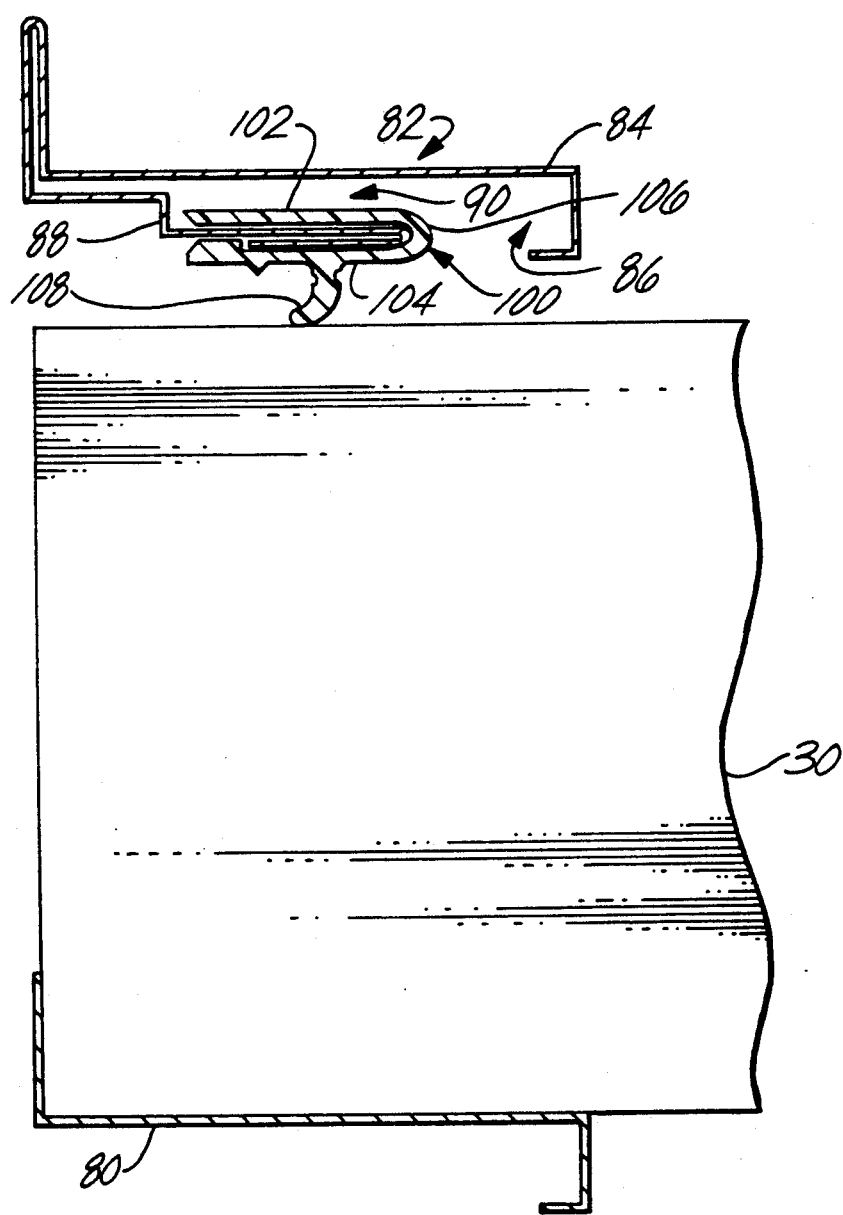
FIG. 4 is a partial section elevation of a horizontal shelf for receiving a plurality of storage cartridges in which the retaining strip is located above and extends transversely of the cartridges.

The present invention is also utilized with storage facilities utilizing horizontal shelves and vertically mounted drawers for holding cartridges on horizontal shelves mounted one above the other in such drawers. In FIG. 4 is shown, a form of the invention as used to hold one of a plurality of storage cartridges on a horizontal shelf.

As shown therein cartridge 30 is placed on shelf 80. A top shelf 82 is attached to a rear wall (not shown) of the storage cabinet. A shelf panel 84 is formed in wall 84 of an elongated sheet of material such as metal which has one lateral edge formed at 90° to the main sheet and with the terminal edge portion thereof being turned back over and parallel to panel 84 to form a recess 86. The end of wall 82 opposite recess 86 is formed to include an extension 88 which forms a recess 90 facing recess 86.

A strip 100 similar to strip 50 is mounted on extension 88 to provide the retaining means for cartridge 30. Strip 100 has side walls 102, 104 and a top wall 106 joining side walls 102, 104 defining a recess which receives extension 88.

A single retaining rib 108 is formed in wall 104 and extends vertically downward to engage the top of cartridge 30. In sliding cartridge 30 into position on shelf 80, rib 108 is compressed and deflected inwardly toward the rear wall of the facility. Cartridge 30 is representative of a plurality of cartridges mountable on shelf 80. Strip 100 extends the length of shelf 80 and rib 108 engages each cartridge which is placed thereon holding them in position against inward or outward as well as side to side movement permitting easy storage and removal of each cartridge mounted side by side on the shelf.

The invention described above may be practiced in many other ways. For example, materials other than molded rubber are contemplated for strips 50 and ribs 58, such as lightweight, flexible plastics. Also, a drawer wall 40 may be constructed integrally with a strip 50. The disclosed structure for attaching the strip 50, comprising shoulder 66 and edge 49, may be changed, and other means for attaching strip 50 to wall 40 are contemplated such as by means of conventional fasteners, adhesives, or other means of mechanical securement. The invention is likewise adaptable to media or cartridges other than microfilm cartridges, such as cartridges or holders for all types of magnetic audio and data recording media including cassettes, tapes, floppy disks, CD containers, etc.

In view of the many possible variations on the present invention, the scope of the invention should be determined not from the specific structures disclosed above, but rather from the specific appended claims.

What is claimed is:

1. Means for retaining plural cartridges in a separated relationship, comprising a strip having an internal cavity defined by two spaced-apart horizontally elongated vertical walls and a top wall, and having a laterally protruding compressible rib attached perpendicular to each vertical wall;
   wherein each rib further includes plural compression notches therein, the notches enabling the ribs to compress inwardly when contacted by the cartridges.

2. Means of claim 1, further including a shoulder ion one vertical wall, the shoulder protruding inwardly into the cavity.

3. Means of claim 2, each vertical wall further including an inwardly upwardly angled bottom edge.

4. Means of claim 3, wherein the top wall is arcuate.

5. An elongated strip for retaining plural cartridges in a drawer, comprising two spaced-apart horizontally elongated vertical walls and an arcuate top wall, each vertical wall having a laterally protruding compressible rib secured thereto,
   wherein each rib further includes plural compression notches enabling the ribs to compress inwardly.

6. The strip of claim 5, further including an inwardly protruding shoulder on the interior of one vertical wall.

7. The strip of claim 6, each vertical wall further including an inwardly upwardly angled bottom edge.

8. Means for retaining plural cartridges in a separated relationship in a cabinet drawer having a drawer floor, the means comprising:
   an elongated vertical channel wall; and
   a retaining strip attached to the vertical wall, the strip having an internal cavity defined by two spaced-apart horizontally elongated vertical walls and a top wall, the vertical channel wall being received by the internal cavity, the strip having a laterally protruding compressible rib attached perpendicular to each vertical wall,
   wherein each rib further includes plural compression notches therein, the notches enabling the ribs to compress inwardly when contacted by the cartridges.

9. Means of claim 8, further including a shoulder on one vertical wall, the shoulder protruding inwardly into the cavity.

10. Means of claim 9, each vertical wall further including an inwardly upwardly angled bottom edge.

11. Means of claim 10, wherein the top wall is arcuate.

12. A storage cabinet drawer adapted for retaining plural cartridges in a spaced-apart relationship, the drawer comprising:
    a drawer floor;
    plural elongated channel walls each having a bottom edge attached to the floor; and
    a retaining strip attached to a top edge of each channel wall, the strip comprising two spaced-apart horizontally elongated vertical walls and a top wall, each vertical wall having a laterally protruding compressible rib secured thereto,
    wherein each rib further includes plural compression notches enabling the ribs to compress inwardly.

13. The drawer of claim 12, further including an inwardly protruding shoulder on one vertical wall.

14. The drawer of claim 13, each vertical wall further including an inwardly upwardly angled bottom edge.

* * * * *

UNITED STATES PATENT AND TRADEMARK OFFICE
CERTIFICATE OF CORRECTION

PATENT NO. : 5,193,891
DATED : March 16, 1993
INVENTOR(S) : James E. Headley

It is certified that error appears in the above-identified patent and that said Letters Patent is hereby corrected as shown below:

Column 2, line 59, before "substantially" delete "the".

Column 3, line 46, before "inwardly" change "a" to -- an --.

In the Claims

Column 5, line 40, change "ion" to -- on --.

Signed and Sealed this

Fifth Day of July, 1994

Attest:

BRUCE LEHMAN

Attesting Officer

Commissioner of Patents and Trademarks